United States Patent

Dallas

[11] Patent Number: 5,294,914
[45] Date of Patent: Mar. 15, 1994

[54] VEHICLE HELMET WARNING SYSTEM

[76] Inventor: Robert S. Dallas, 75 Acorn Rd., Watchung, N.J. 07060

[21] Appl. No.: 22,733

[22] Filed: Feb. 24, 1993

[51] Int. Cl.$^5$ .............................................. B62J 3/00
[52] U.S. Cl. ...................................... 340/432; 340/457
[58] Field of Search ............... 340/432, 427, 438, 457, 340/468; 180/219; 307/9.1

[56] References Cited

U.S. PATENT DOCUMENTS

| | | | |
|---|---|---|---|
| 3,436,726 | 4/1969 | Dentz | 340/457 |
| 3,903,513 | 9/1975 | Green et al. | |
| 4,016,538 | 4/1977 | Miller | 340/457 |
| 4,427,967 | 1/1984 | Maiocco | 340/457 |
| 4,482,885 | 11/1984 | Mochida | 340/457 |
| 5,020,625 | 6/1991 | Yamauchi et al. | 180/219 |
| 5,045,838 | 9/1991 | Ghazarian | 340/457 |

Primary Examiner—Jeff Hofsass
Attorney, Agent, or Firm—Raymond J. Lillie; Kenneth S. Weitzman

[57] ABSTRACT

A warning system to alert the rider of a vehicle such as a bicycle or motorcycle that a safety helmet is not being worn when the rider is mounted on the vehicle seat. The warning system includes a helmet holder for storing the helmet when the vehicle is not being used. A first switch is secured to the helmet holder and is adapted to be positioned so that it closes when a helmet is in the holder, and a second switch is secured to the vehicle and is adapted to be positioned so that it closes when a rider is mounted on the vehicle seat. The two switches are electrically connected in such a manner that an alerting device is energized if both switches are closed, indicating that a rider mounted on the vehicle seat is not wearing a safety helmet.

11 Claims, 3 Drawing Sheets

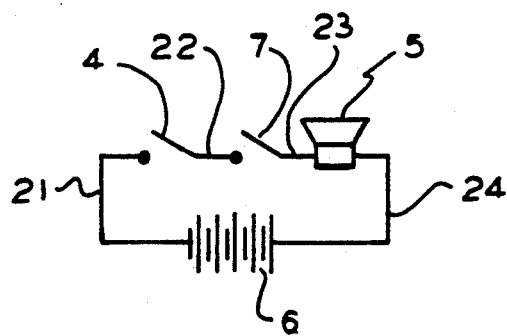
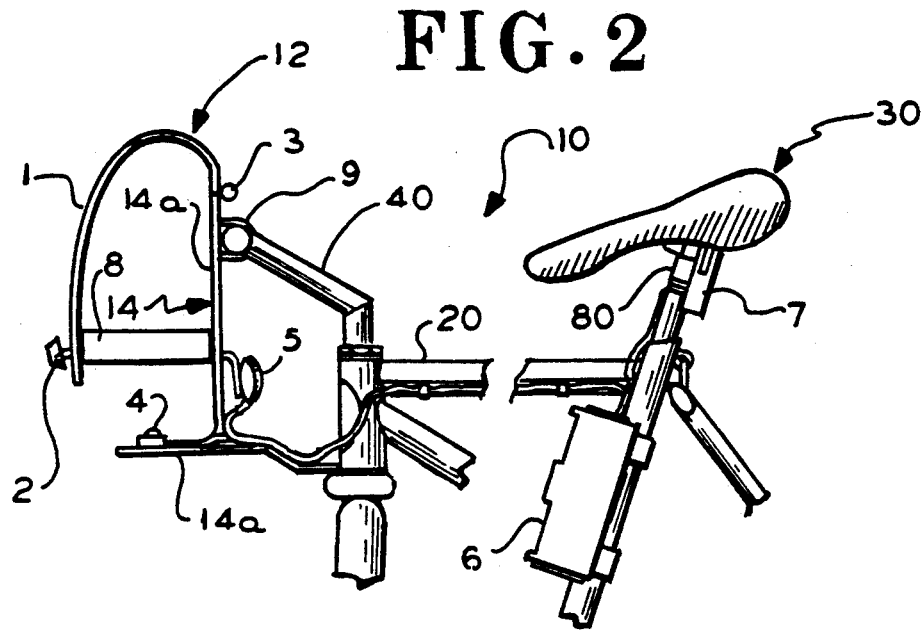
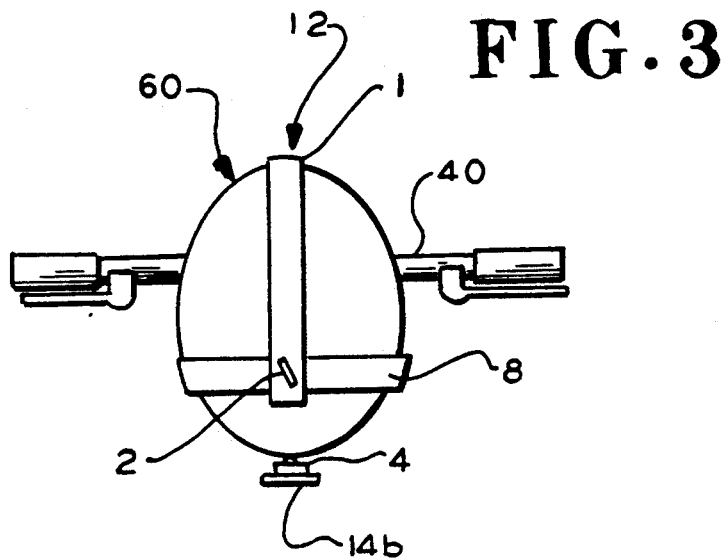

VEHICLE HELMET WARNING SYSTEM

BACKGROUND OF THE INVENTION

The present invention relates generally to a vehicle safety device and, more particularly, to a switch-activated warning system to alert a bicycle rider that a safety helmet is not being worn.

Bicycles and other vehicles have maintained enormous popularity, particularly among children and health-conscious adults. Accompanying this continued popularity has been increased concern over the number of deaths and serious head injuries arising from accidents each year which may have been prevented had riders taken the time to wear safety helmets. To this end, many states have enacted or are considering legislation requiring the mandatory wearing of a safety helmet while on the bicycle or other vehicle.

It is an object of the present invention to provide a system to alert the rider that no helmet is being worn. Insofar as is known, there is no prior art teaching the installation of a safety alerting device on a vehicle to alert the rider that no helmet is being worn.

SUMMARY OF INVENTION

In accordance with an aspect of the present invention, there is provided a safety device for a vehicle, such as for example, a bicycle or motorcycle for alerting the rider that no safety helmet is being worn. The device includes a holder attached to the vehicle for holding and storing the helmet when the vehicle is not in use. The device further includes a first, or helmet-sensing switch located on, in, or near, the helmet holder, and a second switch located on, in, or near a vehicle seat, a power source, and a signal or alerting means, such as, for example, a buzzer, a horn, or a light, whereby an alert is given to the rider when the rider sits on the seat without first removing the helmet from the holder.

BRIEF DESCRIPTION OF THE DRAWINGS

FIG. 2 is a side elevational view of a portion of the bicycle of FIG. 1 with parts broken away and parts omitted;

FIG. 3 is a front view of a portion of the bicycle showing a helmet held in the helmet holder in accordance with the present invention;

FIG. 4 is a schematic diagram of the alert device; and

DETAILED DESCRIPTION OF THE INVENTION

Figure 1:
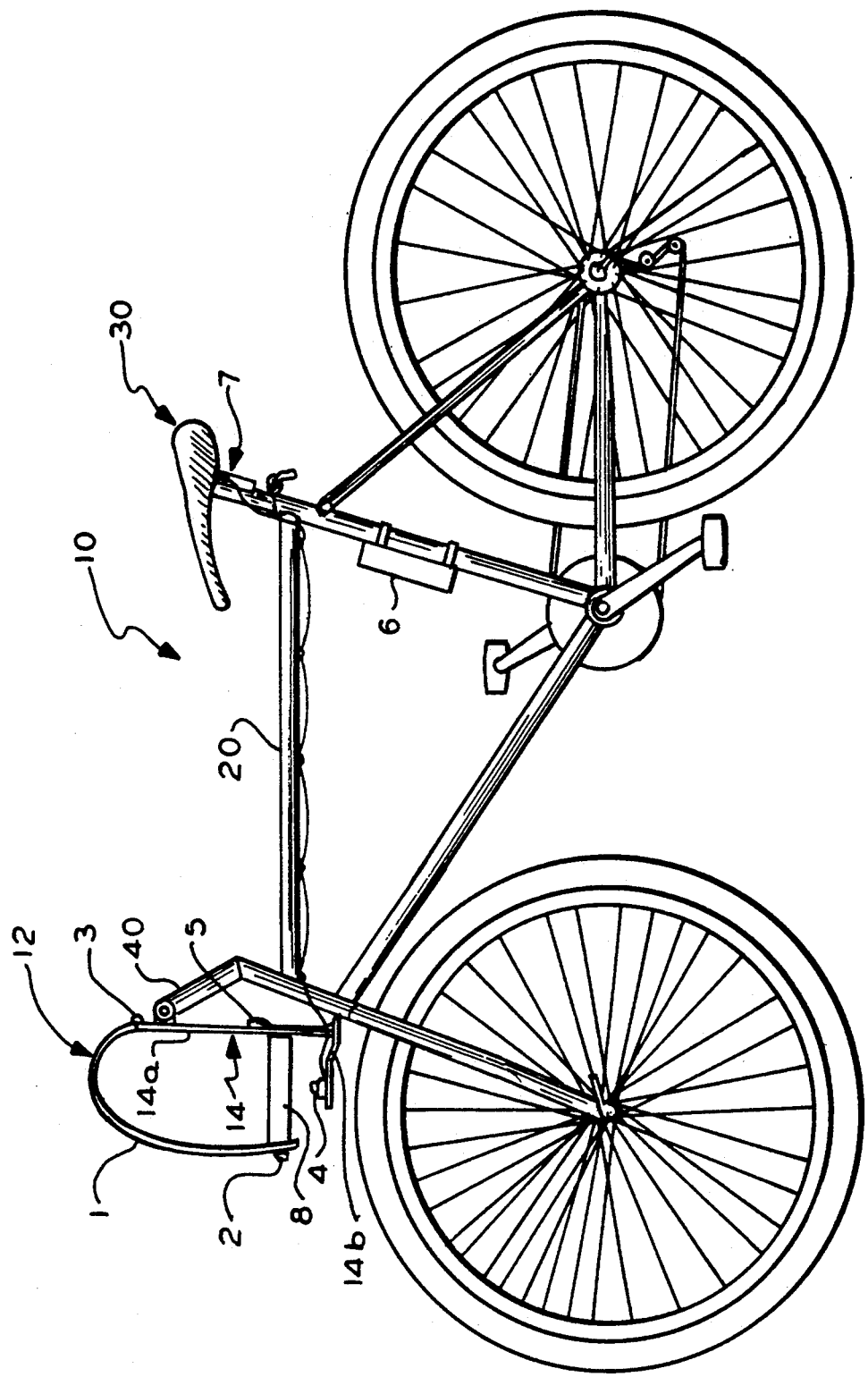
FIG. 1 is a side elevational view of a bicycle on which an alert device in accordance with an embodiment of the present invention is mounted.

Referring to FIG. 1, there is illustrated a bicycle 10 with which the present invention may be used. The bicycle 10 includes a tubular frame 20, a seat 30, and handlebars 40, as illustrated in FIGS. 1 and 2.

It is to be understood that the illustrated bicycle 10 is typical of a vehicle with which this invention may be used. In general, this invention can be used with all vehicles having a seat for a rider who should be wearing a safety helmet. Thus, for purposes of this invention, the construction and location of the illustrated parts described below may differ according to the particular vehicle in which the present invention is used.

As shown in FIGS. 1, 2, and 3, the safety device of this invention includes a helmet holder assembly 12 having a rigid, L-shaped member 14. The L-shaped member 14 has two ends, a first end 14a along the longer section and a second end 14b along the shorter section. The L-shaped member may be made of any rigid commercially available material, such as aluminum or steel. The L-shaped member 14 is securely held to the handlebars 40 by conventional clamps 9, which may be one of any of a variety of commercially available clamps.

Pivotally connected to the first end 14a of the L-shaped member 14 is a flexible and slightly curved securing strap 1. The securing strap may pivot about the L-shaped member 14 by use of a conventional hinge 3, as illustrated in FIGS. 1 and 2. Also rigidly attached to the longer section 14a of the L-shaped member 14 is a side strap 8 which forms a circular opening for receiving a safety helmet 60, as illustrated in FIG. 3.

Securing strap 1 pivots about the L-shaped member 14 between a fully-open position and a fully-closed position. In the fully-open position, the securing strap 1 is pivoted to provide unrestricted access to the circular opening formed by side strap 8. Thus, in the fully-open position, safety helmet 60 may be received in the circular opening of side strap 8 for either insertion or removal of the helmet 60 from the helmet holder assembly 12.

To store the helmet 60 in the holder assembly 12, securing strap 1 is pivoted to its fully-open position and the helmet 60 is received and constrained within the opening of side strap 8. The helmet 60 is supported by the shorter section 14b of the L-shaped member 14 to prevent the helmet 60 from passing completely through the opening of side strap 8. Securing strap 1 is then pivoted to its fully-closed position, thereby wrapping over the top of the helmet 60 to prevent its removal. In the fully-closed position, securing strap 1 may be fastened to side strap 8 by conventional locking means or latch 2, as illustrated in FIGS. 1, 2 and 3.

To sense the presence of the helmet 60 in the holder assembly 12, a normally-open helmet sensing switch 4 is mechanically attached to the L-shaped member 14 and positioned so that the helmet 60 rests upon the helmet sensing switch 4 when the helmet 60 is in the holder assembly 12, thereby closing the contacts of switch 4. The helmet sensing switch 4 may be one of any of a variety of commercially available spring-biased switches.

Figure 5:
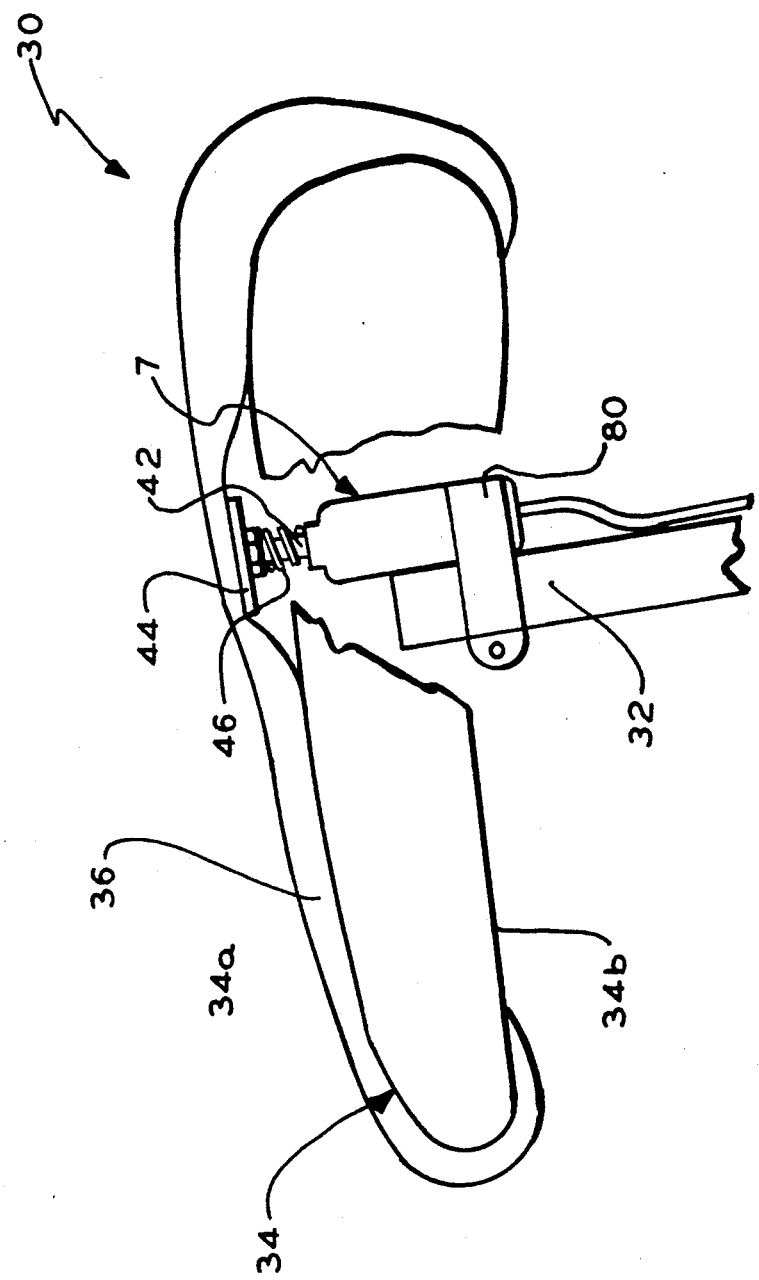
FIG. 5 is a fragmentary, side elevational view of an embodiment of the seat sensing switch and the bicycle seat.

With reference to FIGS. 1, 2 and 5, the safety device also includes a normally open seat sensing switch 7 for sensing when a rider is situated on the seat 30. The seat sensing switch 7 may be one of any of a variety of commercially available spring-biased switches having a slidable rod 44 extending therefrom, as illustrated in FIG. 5. One end of rod 44 has a contacting member biased by a spring 46 away from a pair of mutually spaced contacts (not shown in FIG. 5). The other end of rod 42 extends from switch 7 and terminates in a disc 44.

As illustrated in FIG. 5, a typical vehicle seat 30 includes a seat frame 34 having a top 34a and a bottom 34b. A post 32 extends from the bottom 34b of the seat frame 34 to attach the seat 30 to the vehicle tubular frame 20, as shown in FIGS. 1 and 2. The seat sensing switch 7 is positioned beneath the bottom 34b of the seat frame 34, and is attached to the post 32 by conventional clamping means 80, which may be any of a variety of commercially available clamps. The slidable rod 42 of the switch 7 extends through the seat frame 34 and out of the top 34a and the disc 44 is attached to the end of rod 42 so that it is positioned above the top 34a of the seat frame 34. A cushioned cover 36 is attached to the seat frame 34 so that it covers the top 34a and the disc 44.

When no weight is on the seat 30, the seat sensing switch 7 remains in a normally open position. When a rider is seated on the seat 30, the rider's weight upon the disc 44 causes displacement of the rod 42 which closes the electrical contacts of switch 7. When the rider dismounts the seat 30, spring 46 causes rod 42 to return to its original position, thereby opening the electrical contacts of switch 7.

The safety device further comprises an energizing means, such as a battery or power supply 6, and an alerting means 5, such as a conventional buzzer, horn, or light. Both the power supply 6 and the alerting means 5 are attached to the bicycle 10 in any convenient location and by any conventional manner.

With reference to FIG. 4, the electrical components of this invention are connected in series with one contact of the helmet sensing switch 4 electrically connected to one contact of the seat sensing switch 7 by a wire 22. The other contact of the helmet sensing switch 4 is electrically connected to one terminal of a battery or other power source 6 by a wire 21. Similarly, the other contact of the seat sensing switch 7 is electrically connected to the alerting device 5 by a wire 23. The electrical circuit is completed by electrically connecting the alerting device 5 to the other terminal of the battery or power source 6 by a wire 24.

Accordingly, when a helmet 60 is placed within the holder assembly 12, the helmet 60 closes the contacts of the helmet sensing switch 4. When a rider sits on seat 30, the force on seat 30 closes the contacts of seat sensing switch 7. If both switches 4 and 7 are closed, which occurs when the rider sits upon the seat 30 without first removing the helmet 60 from the holder assembly 12, the resulting series electrical circuit is completed and the alerting device 5 becomes energized, thereby providing either an audio or a visual warning that the rider is not wearing the helmet 60.

Alternatively, removal of the helmet 60 from the holder assembly 12 causes the helmet sensing switch to return to its open position, thereby de-energizing the series circuit and the corresponding alerting device 5 even if the rider is mounted on the seat 30. Similarly, with no rider sitting on the seat 30, the seat sensing switch 7 is in the open position, thereby de-energizing the series circuit and the corresponding alerting device 5 even if the helmet 60 is held in the holding assembly 12.

It is to be understood, however, that the scope of the present invention is not to be limited to the specific embodiments described above. The invention may be practiced other than as particularly described and still be within the scope of the accompanying claims.

I claim:

1. An alert system for warning a rider of a vehicle that a safety helmet is not being worn, comprising:
    a helmet holding means mounted to said vehicle;
    a first switch means mounted to said vehicle for producing a first output when the helmet is held in said helmet holding means, and for producing a second output when the helmet is not held in said helmet holding means;
    a second switch means mounted to said vehicle for producing a first signal when a rider is mounted on a seat of the vehicle, and for producing a second signal when said rider is not mounted on the seat;
    an energizing means mounted to said vehicle, said energizing means responsive to the simultaneous occurrence of said first output and said first signal for producing an energizing output and for producing no output otherwise; and
    an alert means mounted to said vehicle, said alert means responsive to said energizing output for giving the rider a sensory warning, whereby removal of the helmet from said helmet holding means prior to the wearing thereof terminates said sensory alert.

2. The alert system of claim 1 wherein said helmet holding means comprises:
    a first restraint means attached to said bicycle said first restraint means capable of extending across said helmet;
    a second restraint means pivotally attached to said bicycle, said second restraint means being capable of extending across said helmet; and
    a locking means for locking said first restraint means to said second restraint means.

3. The alert system of claim 1 wherein said first switch means is mounted to said helmet holding means and adapted to assume a first normally-open position when there is no helmet in said helmet holding means and be forced into a second closed position when the helmet is in said helmet holding means so as to produce said first output.

4. The alert system of claim 3 wherein said second switch means is mounted to said vehicle and adapted to be maintained in contact with said vehicle seat thereby to assume a first normally-open position when there is no weight on said vehicle seat and be forced into a second closed position in response to a weight on said vehicle seat.

5. The alert system of claim 4 wherein said first switch means, said second switch means, said energizing means, and said alert means are electrically connected in series.

6. The alert system of claim 1 wherein said energizing means is a battery or other power source.

7. The alert system of claim 1 wherein said alert means is an electrically energized horn.

8. The alert system of claim 1 wherein said alert means is an electrically energized light.

9. The alert system of claim 1 wherein said alert means is a buzzer.

10. The alert system of claim 2 wherein said first restraint means is circular having an opening therethrough for receiving said helmet.

11. The alert system of claim 2 wherein said second restraint means has a first pivot position so that said helmet may be received in or removed from said helmet holding means and a second pivot position so that said helmet is retained within said helmet holding means.

* * * * *